United States Patent [19]

Bethe

[11] 4,146,864
[45] Mar. 27, 1979

[54] SYMMETRICAL, FLAT LOAD CELL

[75] Inventor: Klaus Bethe, Ellerbek, Fed. Rep. of Germany

[73] Assignee: U.S. Philips Corporation, New York, N.Y.

[21] Appl. No.: 914,066

[22] Filed: Jun. 9, 1978

[30] Foreign Application Priority Data

Jun. 28, 1977 [DE] Fed. Rep. of Germany ....... 2729064

[51] Int. Cl.² .............................................. G01L 1/22
[52] U.S. Cl. .................................... 338/5; 73/141 A
[58] Field of Search ...................... 338/5, 2; 73/141 A

[56] References Cited

U.S. PATENT DOCUMENTS

| 2,992,556 | 7/1961 | Webster | 73/141 A |
| 2,995,034 | 8/1961 | Boiten | 338/5 X |
| 3,213,400 | 10/1965 | Gieb | 73/141 A X |
| 3,439,761 | 4/1965 | Laimins | 73/141 A |

FOREIGN PATENT DOCUMENTS 1119213 7/1968 United Kingdom ........................ 338/2

OTHER PUBLICATIONS

German Printed Application, Kinanen, 6/1973, 73/141A.

Primary Examiner—C. L. Albritton
Attorney, Agent, or Firm—David R. Treacy

[57] ABSTRACT

A flat load cell comprising a centrally situated point of force application and an axially symmetrical round plate spring which has a variable thickness across the radius and a reinforced edge region, one side thereof being mainly flat while the other side is profiled, strain gauges being provided at the points where the greatest expansion or compression occurs. A second, similarly constructed round plate spring is coaxially arranged with respect thereto, so that their mainly flat sides face each other, while an annular, elastic force transfer member is provided between their reinforced edge regions.

6 Claims, 1 Drawing Figure

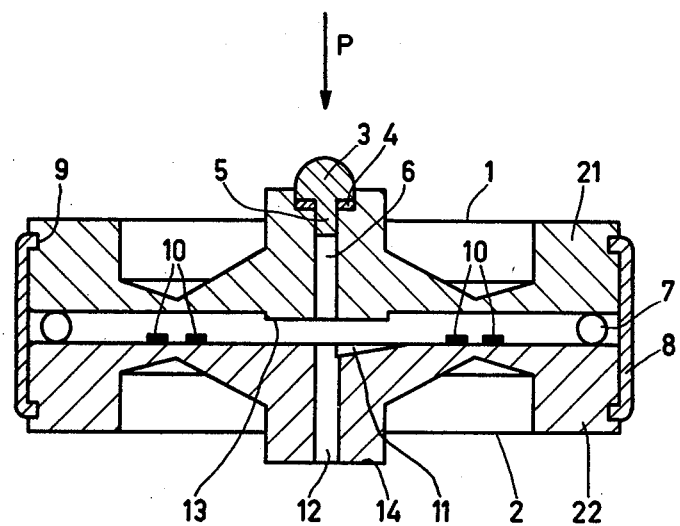

SYMMETRICAL, FLAT LOAD CELL

The invention relates to a flat load cell, having a centrally situated point of force application and an axially-symmetrical, round plate spring which has a thickness which varies across the radius and a reinforced edge region, and one side of which is mainly flat whilst the other side is profiled, strain gauges being provided at the points of greatest expansion or compression.

German Auslegeschrift No. 1 129 317 describes a flat load cell of this kind which is mounted on a support by means of three bolts which are shifted 120° with respect to each other and which act on the reinforced and hence rigid edge region of the round plate spring. The rigid edge region serves to limit the hysteresis, non-linearity and the temperature drift occurring in load cells; these phenomena are caused by relative movement between bolt and support and the resultant friction losses which arise when the load of the load cell changes. This radial deflection movement of the edge region of the round plate spring or of the bolts is greater as the radius of the plate spring is smaller, and cannot even be eliminated by way of very thick outer edges. Hysteresis, non-linearities and temperature drift assume comparatively high values due to the friction losses incurred, because sliding friction occurs between bolts and support in the case of a load change.

The invention has for its object to mimimize the friction losses caused by sliding friction in known load cells of this kind, and to increase the sensitivity of flat load cells.

This object is achieved in accordance with the invention in that a second round plate spring, formed in the same manner, is coaxially arranged opposite the first spring so that their mainly flat sides face each other, an annular, elastic force transfer member being inserted between their reinforced edge regions.

It is thus achieved that in load conditions, during the outwards directed movement of the flat sides of the two round plate springs, bearing on the force transfer member, no radial relative movement occurs therebetween, and that during simultaneous outwards directed expansion of the elastic force transfer member, the round plate springs roll on that member. Between the round plate springs and the force transfer element, therefore, mainly only rolling friction occurs, so that the transfer of force between the two round plate springs is effected substantially without friction, hysteresis, non-linearities and temperature drift thus being reduced such that precision construction of flat load cells is possible. The force transfer member is preferably made of a metal or a metal alloy having an elasticity modulus of between $1.0 \cdot 10^8$ and $2.5 \cdot 10^8$ kPa, for example, bronze or brass.

The force transfer member may be a ring consisting of a number of balls running in a cage, or preferably a ring with a circular bearing face on the round plate springs.

In a further embodiment in accordance with the invention, the two round plate springs are maintained together by an elastic jacket which is provided on the circumference thereof and which enables free movement of the edge regions of the round plate springs.

An embodiment of the device in accordance with the invention will be described in detail hereinafter with reference to the accompanying diagrammatic drawing.

The FIGURE shows a cross-sectional view of a load cell in accordance with the invention.

The flat load cell comprises two axially symmetrical round plate springs 1 and 2, having substantially the same geometrical dimensions and being coaxially arranged with respect to each other, so that the flat sides thereof are situated one opposite the other.

The force acting on the load cell in the direction of the arrow P in the case of a compression load, is applied, in order to achieve a defined direction of force application, via a meber 3 which is constructed as a round head and which is provided with a cam 5 in the downwards direction. This element 3, for example, bearing on an elastic disc 4, is secured, by way of the cam 5, in a bore 6 of the round plate spring 1.

Between the two round plate springs 1 and 2, in the region of their reinforced outer edges 21 and 22, an annular force transfer member 7 is centrally arranged in a suitable manner in that it bears in, for example, guide grooves provided opposite each other over the entire circumference of the round plate springs or in a bearing (not shown), or is provided with spacers which reach as far as a jacket 8 which is provided on the circumference of the round plate springs 1 and 2 and which thus keeps these springs together. The jacket 8 engages grooves 9 provided over the entire circumference of the two round plate springs 1 and 2 and is made of an elastic material such as, for example, synthetic material or a thin metal plate, so that the movement of the edge regions 21 and 22, occurring when the load cell is loaded, does not disturb the round plate springs 1 and 2.

In order to achieve the desired radial variation of the expansion, the two round plate springs 1 and 2 are substantially profiled on their outer sides, whilst their mainly flat, facing sides serve to accommodate, for example, vapour-deposited or foil strain gauges 10 at the areas where the greatest expansion or compression occurs. In the present embodiment, four strain gauges 10 are arranged on the flat side of the round plate spring 2, the electrical connection leads (not shown) of said gauges being fed out through a groove 11 and a bore 12. A cam 13 of the round plate spring 1 serves as an overload protection and ensures that the two round plate springs bear on each other when the load limit is exceeded. For mounting the load cell on a support, there is provided a shaft 14 which at the same time constitutes the force output member.

The force transfer member 7 may be, for example, a ring consisting of a number of balls in a cage, said ring being made of a metal or a metal alloy having an elasticity modulus of between $1.0 \cdot 10^8$ and $2.5 \cdot 10^8$ kPa ($1.0 \cdot 10^6$ and $2.5 \cdot 10^6$ kpcm$^{-2}$), preferably bronze or brass. The ring consists of a number of balls which is dependent of the surface pressure, the facing sides of the edge regions 21 and 22 have been hardened.

In a further embodiment of the force transfer member 7, use is made of an elastic ring, for example, of bronze or brass, comprising a circular bearing face on the round plate springs 1 and 2 and having a circular or lens-shaped section. This ring may bear, either via spacers (not shown) or directly, against the inner face of the elastic jacket 8 and be centrically guided thereby. However, it may alternatively be arranged in guide grooves (not shown) which are provided one opposite the other over the entire circumference of the two round plate springs 1 and 2.

Furthermore, this ring may have a triangular or square section and its acute edges may bear on the two round plate springs 1 and 2 in a circular manner. A ring of this kind is journalled in knife-edge bearings (not shown) which are provided opposite each other over the entire circumference of the two round plate springs 1 and 2.

When a pressure P is exerted on the load cell, the round plate spring 1 becomes concave and the round plate spring 2 becomes convex. The two round plate springs then roll on the ring 7 which at the same time expands in the outward direction, so that only small friction losses occur due to rolling friction.

What is claimed is:

1. A flat load cell, having a centrally situated point of force application and an axially-symmetrical round plate spring which has a thickness which varies across the radius and a reinforced edge region, and one side of which is mainly flat whilst the other side is profiled, strain gauges being provided at the points of greatest expansion or compression, characterized in that a second, similarly constructed round plate spring (2) is coaxially arranged opposite the first spring (1) so that their mainly flat sides face each other, an annular, elastic force transfer member (7) being inserted between their reinforced edge regions (21, 22).

2. A load cell as claimed in claim 1, characterized in that the force transfer member (7) is made of a metal or a metal alloy having an elasticity modulus of between $1.0 \cdot 10^8$ and $2.5 \cdot 10^8$ kPa.

3. A load cell as claimed in claim 1, characterized in that the force transfer member (7) is made of bronze or brass.

4. A load cell as claimed in any of the claims 1 to 3, characterized in that the force transfer member (7) is a ring consisting of a number of balls running in a cage.

5. A load cell as claimed in any of the claims 1 to 3, characterized in that the force transfer member (7) is a ring having a circular bearing face on the round plate springs (1 and 2).

6. A load cell as claimed in any of the claims 1 to 3, characterized in that the two round plate springs (1 and 2) are maintained together by an elastic jacket (8) provided on their circumference.

* * * * *